United States Patent [19]
Wallis

[11] Patent Number: 5,511,853
[45] Date of Patent: Apr. 30, 1996

[54] RECREATIONAL VEHICLE CENTER CONSOLE SEAT WITH FOLDING ARMREST AND BEVERAGE CONTAINER HOLDER

[75] Inventor: David E. Wallis, Dubuque, Iowa

[73] Assignee: Flexsteel Industries, Inc., Dubuque, Iowa

[21] Appl. No.: 225,643

[22] Filed: Apr. 11, 1994

Related U.S. Application Data

[63] Continuation-in-part of Ser. No. 13,663, Sep. 29, 1993.
[51] Int. Cl.$^6$ .............................. B60N 2/02; B60N 2/20; B60N 2/46
[52] U.S. Cl. ................ 297/364; 297/408; 297/188.1; 297/378.12
[58] Field of Search .............................. 297/378.12, 408, 297/181, 188.09, 188.1, 188.20, 284.1, 364, 371, 373, 370

[56] References Cited

U.S. PATENT DOCUMENTS

| | | | |
|---|---|---|---|
| 2,812,227 | 11/1957 | Hill | 297/188.1 |
| 3,083,998 | 4/1963 | Morris . | |
| 3,157,433 | 11/1964 | Davis | 297/364 |
| 3,362,747 | 1/1968 | Fuelling et al. | 297/373 |
| 3,512,827 | 5/1970 | Stange . | |
| 3,547,436 | 12/1970 | Herzer et al. | 297/408 |
| 4,371,206 | 2/1983 | Johnson, Jr. | 297/364 |
| 4,600,240 | 7/1986 | Suman et al. | 297/408 |
| 4,626,028 | 12/1986 | Hatsutta et al. | 297/366 |
| 4,818,017 | 4/1989 | Dykstra et al. . | |
| 4,883,317 | 11/1989 | Davenport | 297/188.1 |
| 4,928,865 | 5/1990 | Lorence et al. . | |
| 4,957,321 | 9/1990 | Martin et al. . | |
| 4,969,682 | 11/1990 | Gray . | |
| 5,026,116 | 6/1991 | Dal Monte . | |
| 5,026,118 | 6/1991 | Vander Stel et al. . | |
| 5,058,953 | 10/1991 | Takagi et al. | 297/408 |
| 5,170,980 | 12/1992 | Burrows et al. . | |
| 5,190,259 | 3/1993 | Okazaki . | |

FOREIGN PATENT DOCUMENTS

| | | | |
|---|---|---|---|
| 0540090 | 2/1956 | Italy | 297/364 |
| 0113742 | 6/1985 | Japan | 297/284.1 |

*Primary Examiner*—Peter M. Cuomo
*Assistant Examiner*—Anthony D. Barfield
*Attorney, Agent, or Firm*—David C. Brezina; Lee, Mann, Smith, McWilliams, Sweeney & Ohlson

[57] ABSTRACT

A vehicle console seat functions as a seat, armrest and beverage container holder for an occupant. The seat back of the console seat can be locked in an upright position and support an occupant sitting on the seat, or the seat back may be released from an upright locked position by applying a lateral force to the side of the seat back, thereby releasing and spring forcing the seat back forward to a fold down position where it can be used as an armrest. The front of the seat may be pivotally opened to expose a beverage container holder. A beverage container holder may also be attached to the rear of the seat.

5 Claims, 5 Drawing Sheets

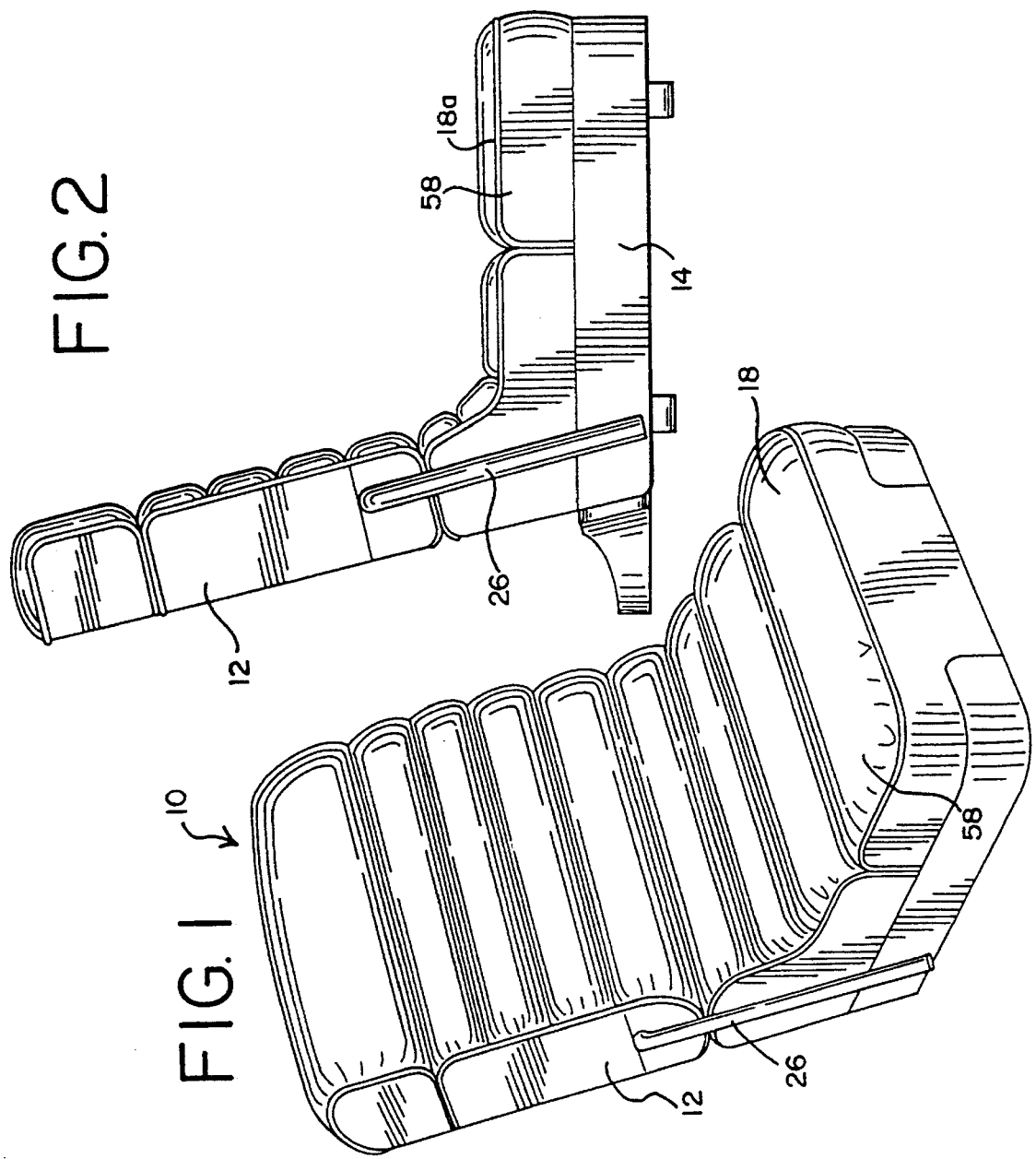

5,511,853

RECREATIONAL VEHICLE CENTER CONSOLE SEAT WITH FOLDING ARMREST AND BEVERAGE CONTAINER HOLDER

BACKGROUND OF THE INVENTION

This application is a continuation-in-part of application Ser. No. 29/013,663 filed Sep. 29, 1993.

The present invention relates generally to a vehicle console or seat, and more particularly to a seat and console which also functions as an armrest and beverage container holder for use in a motor vehicle.

Such a seat is usually positioned adjacent and between two other seats in a vehicle. It may also be positioned apart from other seats in a vehicle. In a typical use the seat back of the console can be positioned in an upright position to either help support a small occupant and/or to allow a continuous level surface between seats. In a folded down position, the console may function as an armrest for occupants sitting on either side of the console. There exists a variety or beverage container or cup holder assemblies utilized for supporting cups, cans and the like in a vehicle such that the vehicle occupants may have a place to support their beverage holders when they desire not hold their beverages in their hands. Beverage container or cupholder assemblies that are concealable in the armrest of a motor vehicle are known in the art. For example, a fold out cup-holder has been contained within an opening arm-rest. There have also been cup-holders which move from a storage position within a structure in a vehicle to a use position.

Armrest assemblies usually have mechanisms which allow the seat back to freely pivot about a point at the rear of the seat bottom or console bottom. There are no locking mechanisms, therefore the only restrictions in the rotational movement of the seat back is the surface of a seat bottom when the seat back is in its folded down position, and any structure which restricts movement of the seat back past an upright position. Such assemblies may allow undesirable unrestricted movement of the seat back, particularly in a moving vehicle where unrestricted movement of any structure inside a vehicle can be dangerous to an occupant.

SUMMARY OF THE INVENTION

The present invention is a seat designed as a center console, usable like a "jump-seat" when the seat back is erect. The front section of the seat contains a fold-in, fold-out cup holder. Another holder can be mounted on the rear of the seat.

When the top seat back is rotated upward relative from the seat bottom, the seat back locks into an upright position. The seat folding mechanism uses a first U-shaped rod, tube, or other elongated member, extending upwardly from the frame of the seat bottom. This rod has two plates welded to it. One of the plates has an inwardly extending locking pin. A second U-shaped member, formed of square tubing in the preferred embodiment and having a second set of pivot plates, is pivotally mounted on the first U-shaped rod, inboard the two plates of the first U-shaped rod. The second U-shaped member pivot plates have pin receiving apertures to receive the locking pin, and hold the seat back in the upright position.

The seat back is folded down by biasing it sidewardly, sliding along the horizontal portion of the U-shaped rod, against spring pressure, thereby, causing the locking pin to move out from the receiving aperture. There is enough clearance between the first pair of plates to permit this movement. Once released from a substantially vertical locked position, the seat back is spring biased to a horizontal armrest position against a first stop. A second stop provides a backup for the pin in the up position.

The front section of the seat bottom is hinged to the front of the seat. The top of the front section has a layer of upholstered cushion, which forms part of the seating surface of the seat cushion when in the closed position. The front section provides a lid-type opening. When this section is opened about the hinges, access to beverage-holders and a small storage area become available to an occupant sitting adjacent the console/seat.

BRIEF DESCRIPTION OF THE DRAWINGS

FIG. 1 is perspective view of the invention with the seat back in an upright position and with the opening portion closed.

FIG. 2 is a side view of the invention with the seat back in an upright position and with the opening position closed.

FIG. 3 is a front view of the invention with the seat back in an upright position with the opening position closed and with a portion of the seat back cushion cut away to show the folding and locking mechanisms.

DESCRIPTION OF THE PREFERRED EMBODIMENT

Figure 5:
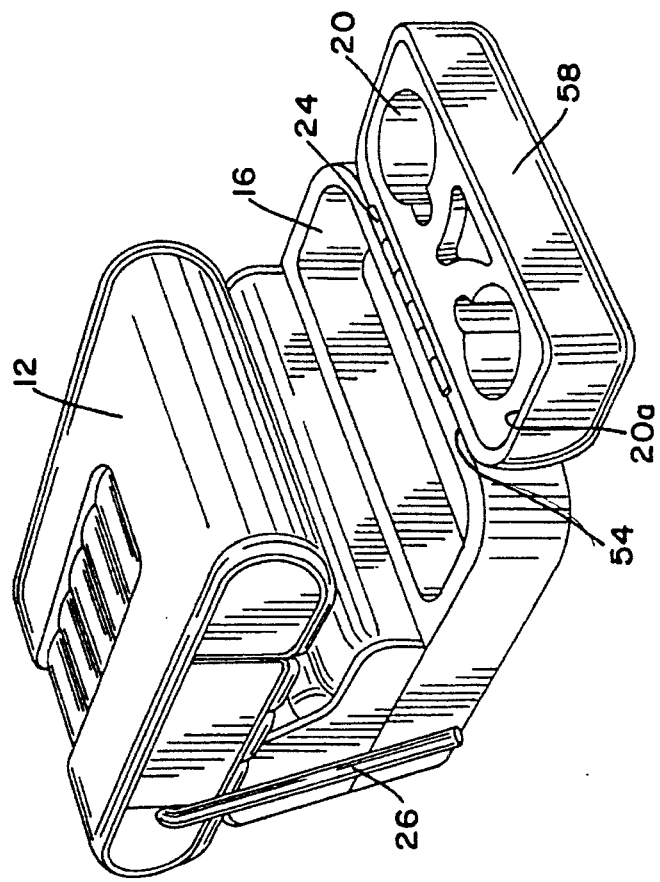
FIG. 5 is a perspective view of the invention with the seat back in a folded down position and the opening position opened exposing the cupholders and storage trays.

Referring to the drawings in greater detail, the seat/console 10 of the present invention essentially consists of a seat back 12, a seat bottom 14, and a first U-shaped member 26 (better illustrated in FIG. 11) connecting the seat back 12 with the seat bottom 14.

Figure 7:
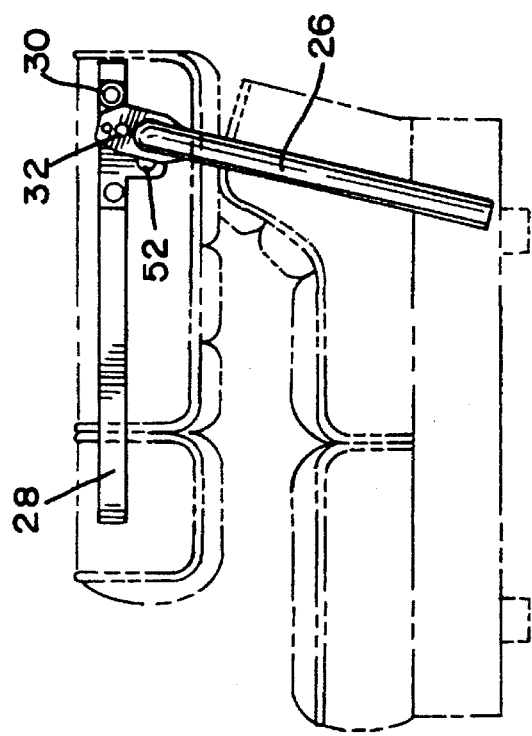
FIG. 7 is a side view of the invention with the seat back in a folded down position showing the framework of the seat back.
Figure 6:
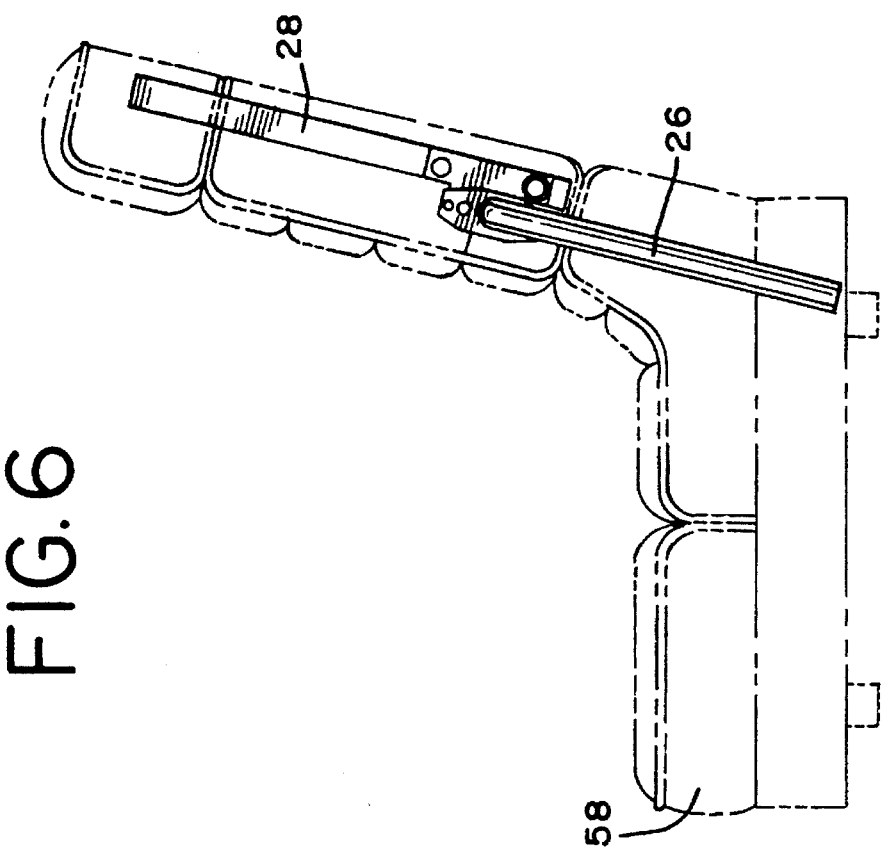
FIG. 6 is a side view of the invention with the seat back in an upright position showing the framework of the seat back.
Figure 8:
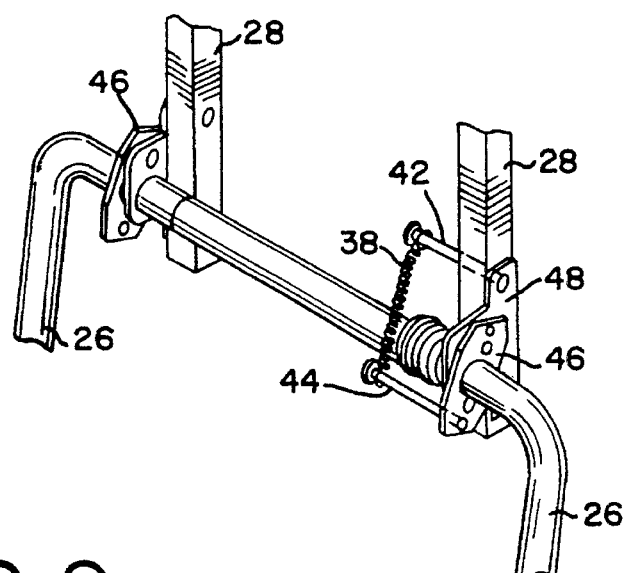
FIG. 8 is a perspective view of the folding and locking mechanism of the seat back.
Figure 9:
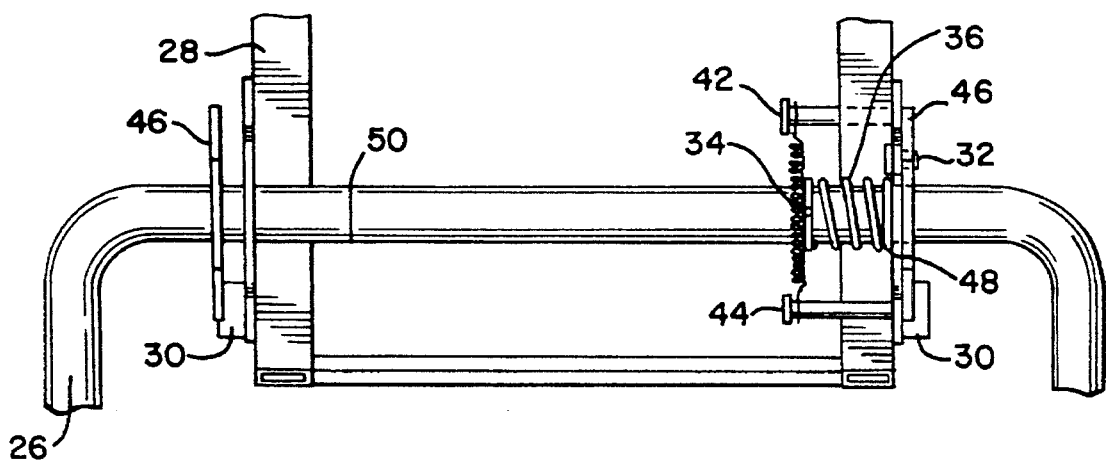
FIG. 9 is a frontal view of the folding and locking mechanism of the seat showing the locking pin positioned in a receiving aperture.
Figure 10:
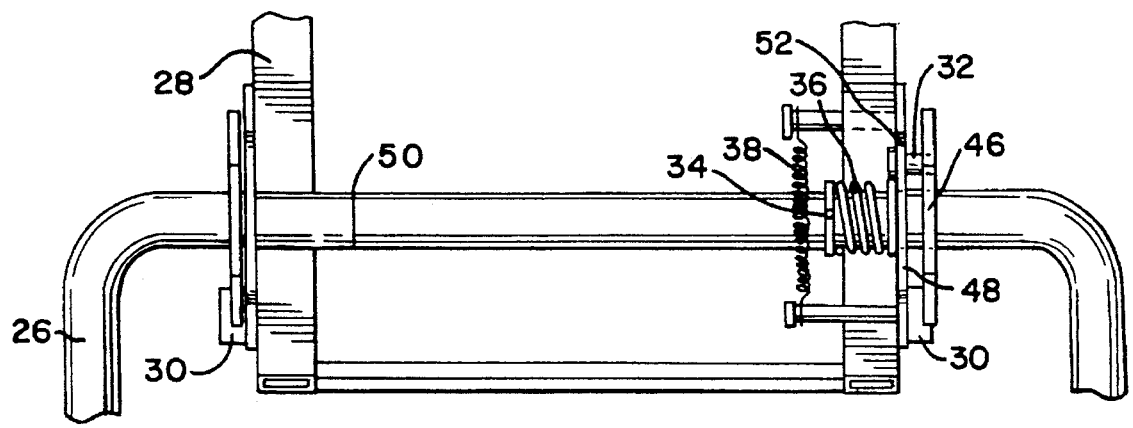
FIG. 10 is a frontal view of the folding and locking mechanism of the seat showing the U-frame biased with the locking pin out of the receiving aperture.
Figure 11:
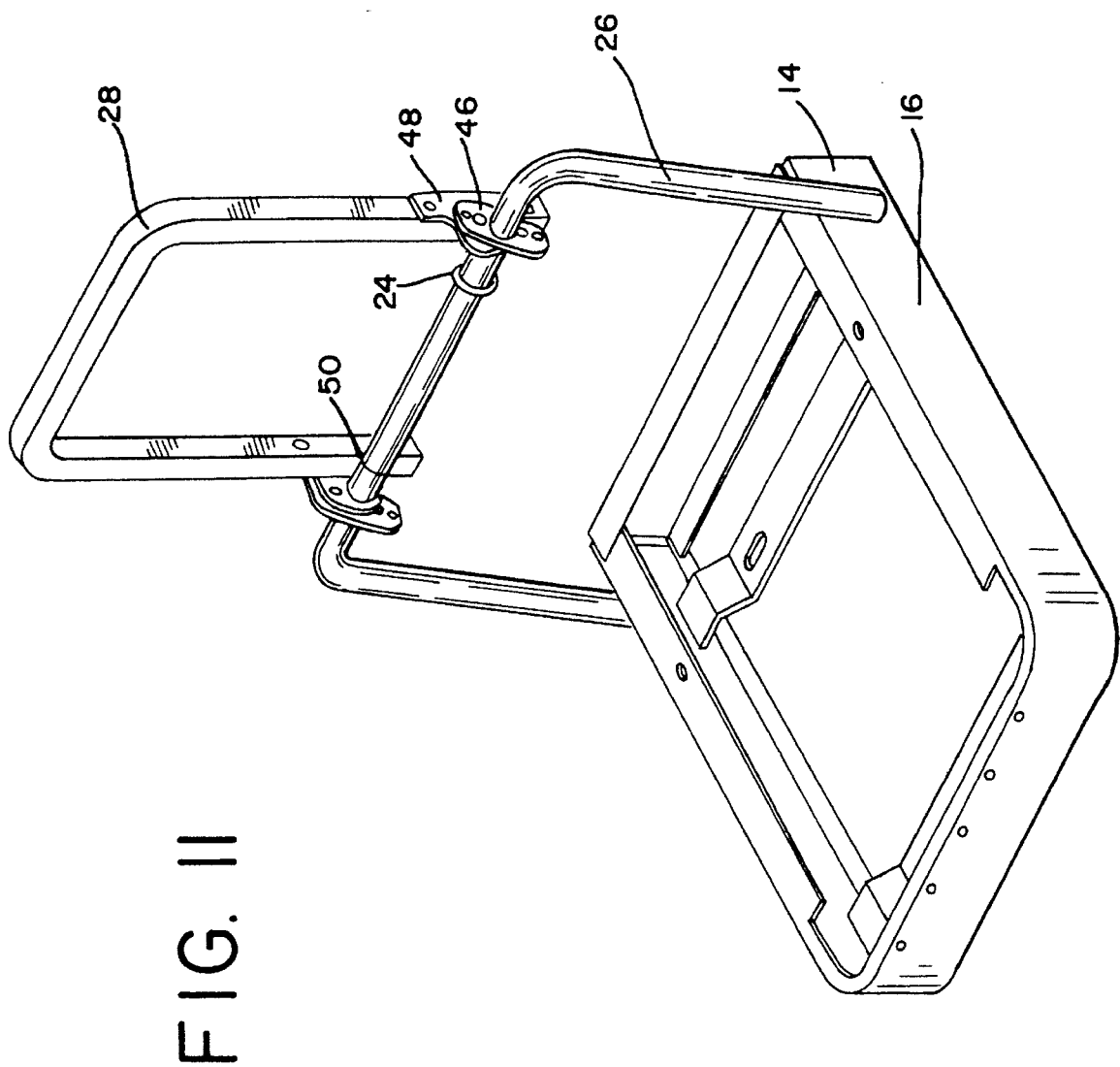
FIG. 11 is a perspective view of the seat frame in an upright position.

Important functions of the seat/console 10 include folding the seat back 12 down to utilize an arm rest feature (as seen in FIG. 5 and 7), and also bringing the seat back 12 to an upright position to where it locks into place and can be utilized as a seating structure (as seen in FIG. 1–2, 4 and 6). These functions are accomplished by the use of a first U-shaped member 26 attached to and extending upwardly from the frame 16 of the seat bottom 14 (FIG. 11). Pivotally connected to the first U-shaped member 26 is a second U-shaped member 28.

FIG. 8–11 illustrates an embodiment with two side plates 46 mounted to the horizontal portion of first U-shaped member 26. One side plate 46 has an inwardly extending locking pin 32. The pin, in the preferred embodiment, provides one locking element. A second U-shaped member 28, formed of square tubing in the preferred embodiment, is pivotally mounted on the first U-shaped member 26, inboard the side plates 46. The second U-shaped member 28 has two pivot plates 48 mounted on each of its normally vertical portions 28a (FIG. 11). One of the pivot plates 48 is adjacent to the side plate 46 having the inwardly extending locking pin 32 and is biased against the side plate 46 by a spring 36. The pivot plate 48 has an aperture 52 for receiving the locking pin 32 when the seat back 12 is in an upright position. The aperture 52 in the preferred embodiment, provides a second locking element, complementary to the pin 32. The relative positions could be reversed, without departing from the invention described herein.

At a predetermined horizontal distance inward from the side plates 46 of the first U-shaped member 26 are E-ring grooves 50. Seated in the E-ring groove 50 adjacent the side plate 46 having the inserted pin 32 is an E-ring 34. The E-ring 34 provides a stop or collar against which a spring can bear. Other alternatives such as pins, with or without washers, clamps or nuts could provide the function of this collar. Wrapped around the normally horizontal section of the first U-shaped member 26 and biased between the E-ring, or collar, 34 and a pivot plate 48 is a first spring 36. The first spring 36 is what biases the pivot plate 48 against the side plate 46. While this embodiment is preferred, other biasing arrangements could accomplish the function.

Mounted and extending inwardly from the bottom of the side plate 46 is a first rod, tube, or other elongated member, 44. Extending inwardly from the normally vertical portion of the second U-shaped member 28 is a second rod, tube, or other elongated member, 42. A second spring 38 is attached in tension between the first rod 44 and the second rod 42. Extending outward from the bottom of both pivot plates 48 are stop bushings 30.

In operation, the seat back 12 is folded down by biasing the seat back 12, sliding along the horizontal portion of the first U-shaped member, against spring pressure created by the first spring 36. By biasing the seat back 12 in this lateral direction, the locking pin 32 is forced out of the aperture 52 of the pivot plate 48. The disengagement of the locking pin 32 from the aperture 52, and the tension created by the second spring 38 between the first rod 44 and the second rod 42, forces the top of the seat back 12 forward and toward a folddown position.

When the seat back 12 is in a folded down position, the stop bushings 30 abut against the upper portion of the side plates 46, preventing further downward rotation of the top of the seat back 12. The stop bushings 30 abut against the side plates 46 when to seat back 12 is normally in its folded down horizontal position. Likewise, when the seat back 12 is in its upright locked position, the stop bushings 30 abut against the bottom portion of the side plates 46 preventing further rotation in the opposite direction.

Figure 4:
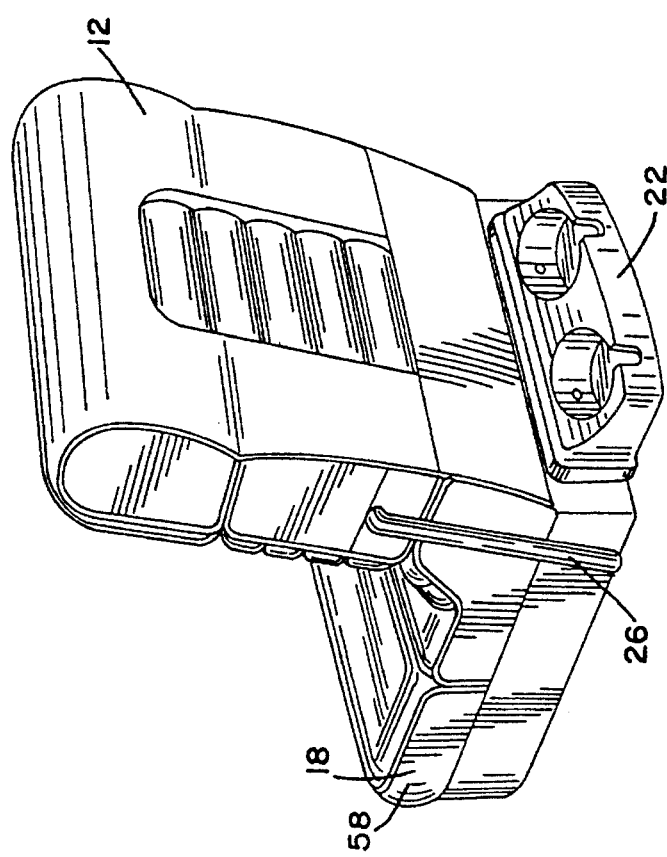
FIG. 4 is perspective view of the rear of the invention with cupholders attached thereto.

Referring now to FIG. 4 and 5, the front of the seat bottom 14 has a hinged lid 58. The lid 58 is hinged to the front of the seat bottom 14. In the closed position the top of the lid 58 is covered by cushioned upholstery for occupant comfort, while the bottom of the lid 58 has a first cut-out portion 20a. The first cut-out portion 20a holds the front beverage container holder 20 therein. The lid 58 is in an opened position when the top of the lid 58 having the cushioned upholstery 18 is rotated about the hinge 24 in the preferred embodiment 180 degrees, exposing the front beverage container holder 20 seated in the 20a first cut-out portion. A second cut-out section 60 integral to the seat bottom 14 is located under the lid 58 when the lid 58 is in a closed position. When the lid 58 is in the open position the second cut-out section 60 is on the opposite side of the hinge in relation to the first cut-out 20a portion and is therefore exposed as seen in FIG. 5. The front beverage holder 20 can include one or more beverage holder openings 56, and can be integral within the lid 58 or may sit within the first cut-out portion 20a and be removable.

FIG. 4 illustrates a rear beverage container holder 22 which may be separately attached to the rear of the seat bottom 14.

What is claimed is:

1. A console and seat assembly comprising:

a seat bottom having a frontal section and rear section with said frontal section having a top and bottom segment with said bottom section having a frame;

a seat back having two sides, the seat back being pivotally connected to said seat bottom and having a means for locking the seat back in an upright position relative to the seat bottom;

said means for locking the seat back being disengageable upon application of a lateral force against a side of the seat back;

wherein said means for locking the seat back further comprises;

a first U-shaped member extending upwardly from said frame;

a second U-shaped member pivotally mounted to the first U-shaped member;

wherein said first U-shaped member has at least one side plate attached thereto;

said side plate having either an inwardly extending locking pin or an aperture for receiving a pin;

and said second U-shaped member having at least one pivot plate attached thereto, with the pivot plate of the second U-Shaped member having either an outwardly extending locking pin or an aperture;

the pin or aperture of the side plate of the first U-shaped member being positioned to lockingly engage with the pin or aperture of the pivot plate of the second U-shaped member when the seat back is in an upright position, said pin being held in said aperture by a spring means, and, wherein said spring means includes a spring wrapped around the first U-shaped member and biased between collar and said side plate.

2. A console and seat assembly, comprising:

a seat bottom having a frontal section and rear section with said frontal section having a top and bottom segment with said bottom section having a frame;

a seat back having two sides;

a first U-shaped member extending upwardly from said frame;

a second U-shaped member pivotally mounted to the first U-shaped member;

the seat back being pivotally connected on said first U-shaped member relative to said seat bottom and having a locking mechanism to lock the seat back in a selected position relative to the seat bottom;

the first U-shaped member having at least One side plate attached thereto, the side plate having one of an inwardly extending locking pin or an aperture for receiving a pin;

the second U-shaped member having at least one pivot plate attached thereto, with the pivot plate of the second U-Shaped member having either an outwardly extending locking pin or an aperture;

the pin or aperture of the side plate of the first U-shaped member being positioned to lockingly engage with the pin or aperture of the pivot plate of the second U-shaped member when the seat back is in an upright position, said pin being held in said aperture by a spring mechanism, and the first U-shaped member having a collar; a first spring being positioned around a horizontal portion of said first U-shaped member and between said collar and a pivot plate of the second U-shaped member:

the first spring biasing the pivot plate of the second U-shaped member against a side plate formed and arranged on the first U-shaped member.

3. The console and seat of claim 2 further comprising a means for biasing said seat back to a folddown position.

4. The console and seat of claim 2, wherein said console and seat includes means for biasing the seat back to a fold down position, said means for biasing the seat back includes:

a first rod extending horizontally from a side plate, said side plate being connected to the first U-shaped member;

a second rod extending horizontally from a vertical section formed and arranged as a connected portion of the second U-shaped member, and a second spring having a first end and a second end, said first end being connected in tension to said first rod and said second end being connected in tension to said second rod, thereby biasing the first rod toward the second rod, thereby biasing the seat back to a fold down position.

5. A console and seat assembly, comprising:

a seat bottom having a frontal section and rear section with said frontal section having a top and bottom segment with said bottom segment having a frame;

a seat back having two sides;

a first U-shaped member extending upwardly from said frame;

a second U-shaped member pivotally mounted to the first U-shaped member; the seat back being pivotally connected on said first U-shaped member relative to said seat bottom and having a locking mechanism to lock the seat back in a selected position relative to the seat bottom;

said console and seat including a means for biasing the seat back to a fold down position;

said means for biasing the seat back including a first rod extending horizontally from a side plate, said side plate being connected to the first U-shaped member; a second rod extending horizontally from a vertical section formed and arranged as a connected portion of the second U-shaped member, and a second spring having a first end and a second end, said first end being connected in tension to said first rod and said second end being connected in tension to said second rod, thereby biasing the first rod and second rod toward one another, and thereby biasing the seat back to a fold down position.

* * * * *